(12) United States Patent
Benakli et al.

(10) Patent No.: US 9,017,833 B2
(45) Date of Patent: Apr. 28, 2015

(54) PATTERNED MAGNETIC MEDIA FOR MAGNETIC RECORDING

(75) Inventors: Mourad Benakli, Pittsburgh, PA (US); Michael L. Mallary, Harmony, PA (US)

(73) Assignee: Seagate Technology LLC, Cupertino, CA (US)

( * ) Notice: Subject to any disclaimer, the term of this patent is extended or adjusted under 35 U.S.C. 154(b) by 1306 days.

(21) Appl. No.: 11/771,440

(22) Filed: Jun. 29, 2007

(65) Prior Publication Data
US 2009/0004509 A1 Jan. 1, 2009

(51) Int. Cl.
*G11B 5/66* (2006.01)
*G11B 5/855* (2006.01)

(52) U.S. Cl.
CPC ..................................... *G11B 5/855* (2013.01)

(58) Field of Classification Search
None
See application file for complete search history.

(56) References Cited

U.S. PATENT DOCUMENTS

| | | | |
|---|---|---|---|
| 5,723,033 A | 3/1998 | Weiss | 204/192.15 |
| 5,858,474 A | 1/1999 | Meyer et al. | 427/555 |
| 6,103,099 A | 8/2000 | Wittenbrink et al. | 208/27 |
| 6,139,936 A | 10/2000 | Weiss | 428/141 |
| 6,680,079 B1 | 1/2004 | Stirniman et al. | 427/130 |
| 6,699,332 B1 | 3/2004 | Piramanayagam et al. | 148/121 |
| 6,738,207 B1 | 5/2004 | Belser et al. | 360/31 |
| 6,753,130 B1 | 6/2004 | Liu et al. | 430/313 |
| 6,807,025 B1 | 10/2004 | Benakli et al. | 360/66 |
| 7,075,756 B1 | 7/2006 | Mallary et al. | 360/317 |
| 7,147,790 B2 | 12/2006 | Wachenschwanz et al. | 216/22 |
| 7,149,045 B1 | 12/2006 | Mallary et al. | 360/55 |
| 7,161,755 B1 | 1/2007 | Benakli et al. | 360/55 |
| 7,230,790 B1 | 6/2007 | Mallary et al. | 360/77.08 |
| 2004/0091748 A1* | 5/2004 | Kamata et al. | 428/694 T |
| 2004/0131890 A1* | 7/2004 | Kikitsu et al. | 428/694 B |
| 2005/0164035 A1* | 7/2005 | Lee et al. | 428/694 MT |
| 2006/0001996 A1* | 1/2006 | Aoyagi et al. | 360/55 |
| 2006/0029834 A1* | 2/2006 | Suwa et al. | 428/848.5 |
| 2006/0040140 A1* | 2/2006 | Kaizu et al. | 428/829 |
| 2006/0093863 A1* | 5/2006 | Tsuchiya et al. | 428/827 |

\* cited by examiner

*Primary Examiner* — Holly Rickman
*Assistant Examiner* — Lisa Chau
(74) *Attorney, Agent, or Firm* — Westman, Champlin & Koehler, P.A.

(57) ABSTRACT

A patterned magnetic media is disclosed. The patterned media includes etched recording portions including etched portions of a soft magnetic underlayer. In illustrated embodiments, the soft magnetic layer is etched to form recording bits or etched soft magnetic segments to enhance magnetic field strength in the magnetic recording portions. In other embodiments, soft magnetic layers are deposited in etched regions or areas of the media.

16 Claims, 12 Drawing Sheets

PATTERNED MAGNETIC MEDIA FOR MAGNETIC RECORDING

BACKGROUND

Data storage devices encode data on a magnetic recording media. Data is encoded on the magnetic recording media in longitudinal or perpendicular recording patterns. Magnetic media for a perpendicular recording pattern typically include a magnetic recording layer and a soft magnetic underlayer. The soft magnetic underlayer provides a magnetic flux path to enhance the magnetic field in the magnetic recording layer. Form factors for data storage devices are becoming smaller and more compact thereby increasing demand for higher recording densities. With higher recording densities, magnetic recording widths are becoming smaller and consequently the width of the write pole $W_{pole}$ is narrower to accommodate smaller recording widths. The narrow width of the write pole limits the magnitude flux generated by the write pole and thus the magnetic field in the magnetic recording layer. Embodiments of the present invention provide solutions to these and other problems, and offer other advantages over the prior art.

SUMMARY

The application relates to a patterned magnetic media for a magnetic storage device. The patterned media includes etched recording portions, which include etched portions of a soft magnetic underlayer. In illustrated embodiments, the soft magnetic layer of the media is etched to form radially and circumferentially spaced recording bits including a soft magnetic segment. In illustrated embodiments, the soft magnetic segment enhances magnetic field strength of the magnetic recording layer. In other embodiments, soft magnetic layers are deposited in etched regions or areas of the media. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
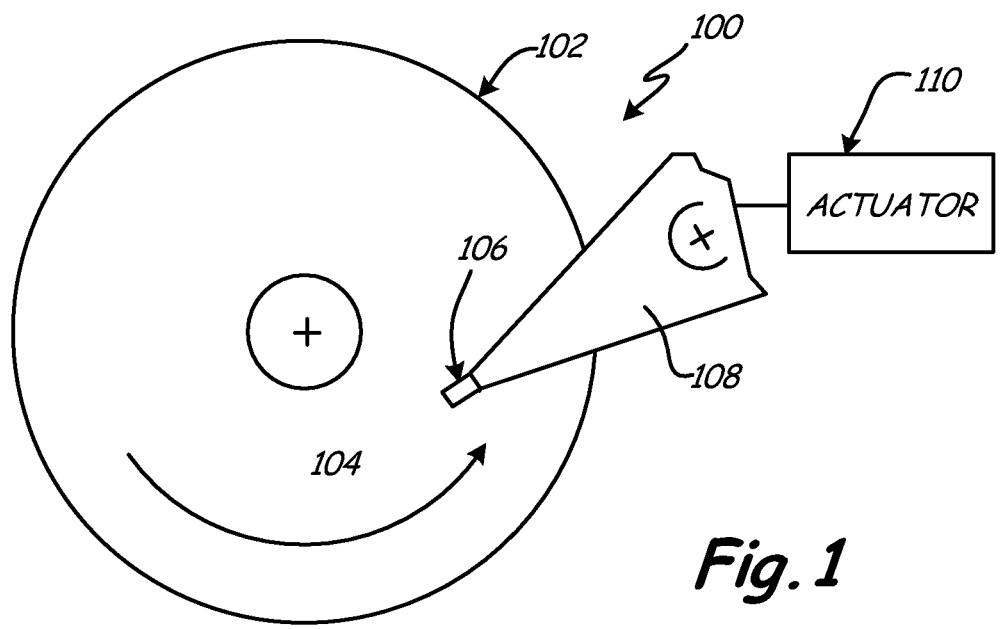
FIG. 1 is a schematic illustration of a data storage device.

FIG. 1 is a schematic illustrates of a data storage device 100 including a magnetic media 102 for storing digital information or data. In the illustrated embodiment, the media 102 is a disc, which rotates as illustrated by arrow 104 via operation of a spindle motor (not shown). The device 100 includes a head 106 to read data from and/or write data to the magnetic disc or media 102. As shown, the head 106 is carried on a suspension arm 108 coupled to an actuator assembly 110 (illustrated schematically) which moves the head relative to concentric tracks on the disc or media for read/write operations. In an illustrated embodiment the actuator assembly 110 includes a voice coil motor (not shown) which is energized to radially move the head 106 to position the head 106 relative to the concentric data tracks for read/write operations.

Figure 2:
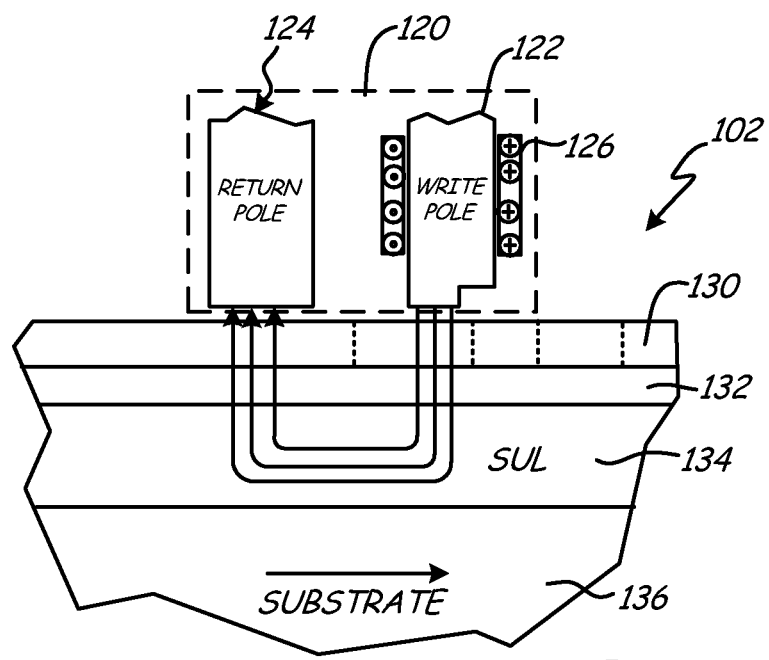
FIG. 2 is schematic illustration of a write element of a data storage device configured to record data to a data storage media.

The head 106 includes an inductive write element 120 as shown in FIG. 2 to encode data on the disc or media 102. Data is encoded in a parallel (longitudinal) recording pattern or a perpendicular recording pattern. In the illustrated embodiment shown in FIG. 2, the write element 120 is configured to encode data in a perpendicular recording pattern. As shown, the write element 120 shown in FIG. 2 includes a write pole 122, a return pole or shield 124 and coil 126. For write operations, the coil 126 is energized to generate a magnetic flux path between the write pole 122 and the return pole 124. For perpendicular recording, the magnetic media 102 includes a magnetic recording layer 130, an intermediate or non-magnetic layer 132 and a soft magnetic underlayer 134 ("SUL"). The magnetic recording layer 130 is formed of a hard magnetic material that has low permeability and high coercivity for recording data. The soft magnetic underlayer is formed of a weaker or soft magnetic material relative to the magnetic recording layer 130. The soft magnetic layer has a relatively high permeability and relatively low coercivity to provide a magnetic flux path for the magnetic recording layer. Example soft magnetic materials includes NiFe or CoZrNb.

Upon energization of the coil 126, the soft magnetic underlayer 134 provides a mirror image of write pole 122 to provide a magnetic flux path that focuses the magnetic field of the write pole 122 through the magnetic recording layer 130 to the return pole 124. Intermediate layer 132 is a non-magnetic layer formed of a material, such as CrTa or NiAl and is used to enhance crystallographic properties of the magnetic recording layer 130 to control segregation and crystallography of the grains in the recording layer 130.

As previously discussed, the coil 126 is energized to generate a flux path through the magnetic recording layer 130 to record data to the magnetic recording layer 130. The direction of current through the coil 126 is altered to change the polarity of the write pole 122 and thus alter the recording direction or polarity of the recording layer 130. In particular, the coil 126 is energized in a first direction to provide a magnetic flux path from the write pole 122 in a downward recording direction. The coil 126 is energized in a second direction to provide a magnetic flux path toward the write pole 122 in an upward recording direction.

As shown in FIG. 2, the magnetic recording layer 130, intermediate layer 132 and soft underlayer 134 are fabricated on a substrate 136 of a disc or other media (e.g. magnetic tape). Example substrate materials include aluminum, glass, ceramic or other materials as will be appreciated by those skilled in the art.

Figure 3:
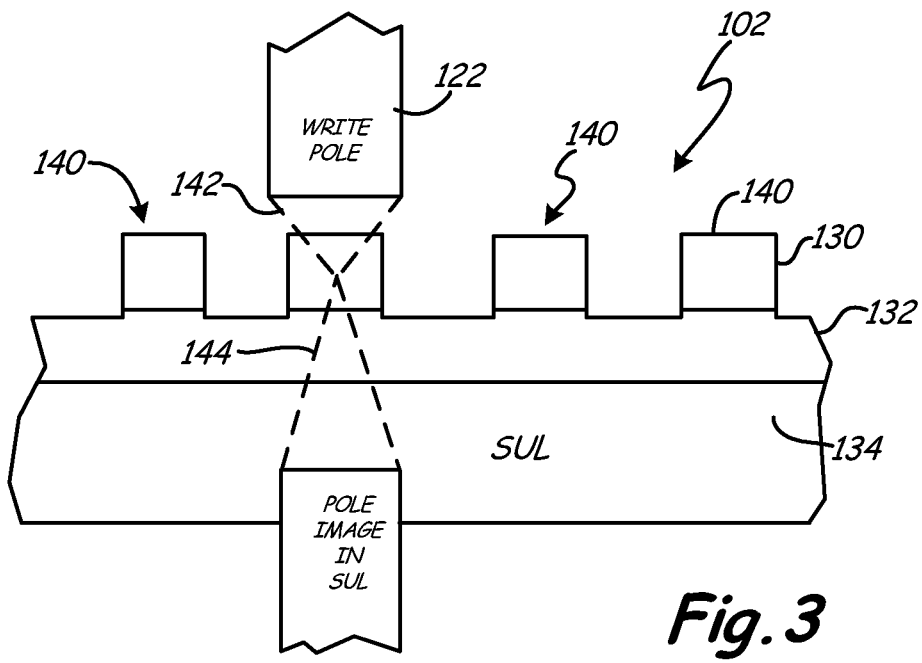
FIG. 3 is a schematic illustration of a write pole and data storage media having raised recording portions.

In the illustrative embodiment shown in FIG. 3, the media or disc 102 is patterned to form raised or etched recording portions 140. During write operations as shown in FIG. 3, the write pole 122 is positioned proximate to the recording portions 140. Upon energization, the write pole 122 provides a flux path focused in a subtended angle 142. The pole image in the soft underlayer 134 provides a contrast image angle 144 to focus the magnetic flux in the recording layer or portions 130 and provide a closed flux path between write pole 122 and return pole 124. The subtended angle 142 of the write pole 122 and pole image angle 144 of the soft magnetic underlayer 134 define the magnetic field B in the recording layer or portion. For an infinitely thick write pole 122, the magnitude of the magnetic field B in the center of the recording layer or portion is proportional to:

$$B \approx (B_{sat}/\pi)(\tan^{-1}[W_{pole}/D_{SUL}] + \tan^{-1}[W_{pole}/3D_{SUL}])$$

where B is the magnetic field in the center of the magnetic recording layer;

$B_{sat}$ is the saturation flux of the write pole 122;

$W_{pole}$ is the width of the write pole 122;

$D_{SUL}$ is the distance of the write pole to the top of the soft magnetic underlayer 134.

The above equation assumes that the center of the media is half the distance from the write pole 122 to the top of the soft magnetic underlayer 134 ($D_{SUL}/2$). In the above equation $W_{pole}/D_{SUL}$ represents the subtended angle 142 of the write pole 122 and $W_{pole}/3D_{SUL}$ represents the image angle 144 from the soft magnetic underlayer 134. Thus as illustrated, the magnetic field strength B is proportional to the subtended angle 142 of write pole 122 and image angle 144 of the soft magnetic underlayer 134. Form factors for data storage devices are becoming smaller and more compact thereby increasing demand for higher recording densities. With higher recording densities, the recording widths are becoming smaller and consequently the width of the write pole $W_{pole}$ is narrower to accommodate the smaller recording widths.

As illustrated by the equation above, the narrow pole width $W_{pole}$ reduces the subtended angle 142 and image angle 144 of the recording media. This reduces the magnetic field in the recording layer for a give magnetic flux saturation $B_{sat}$ of the write pole 122. In illustrated embodiments described herein, the soft magnetic underlayer 134 is etched to enhance the magnetic pole image 144 to increase the magnetic field in the magnetic recording layer 130.

Figure 4:
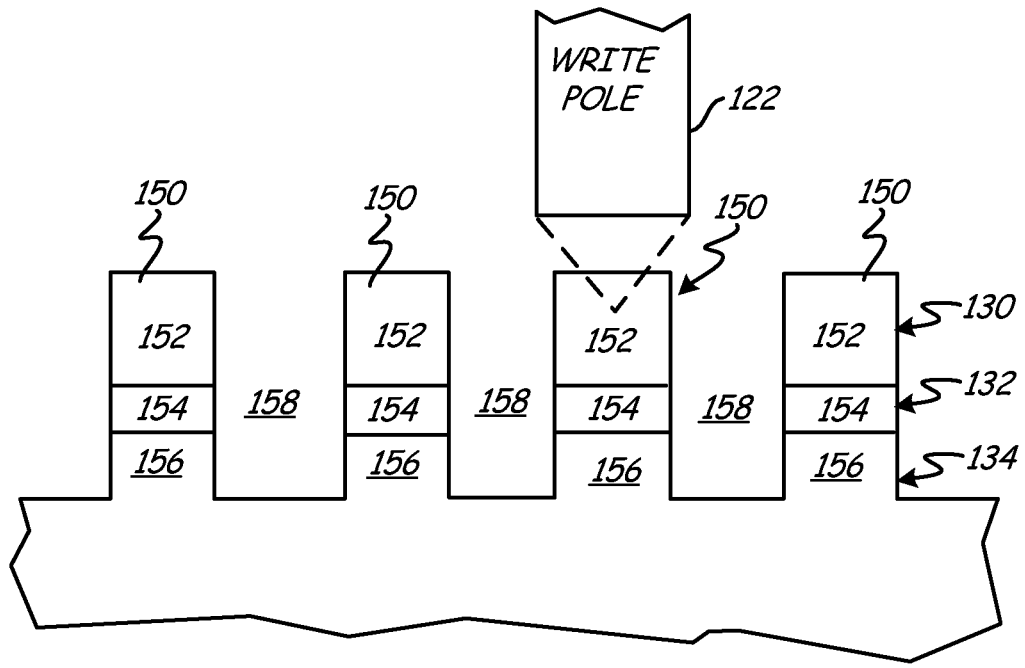
FIG. 4 is a schematic illustration of a write pole and data storage media having raised recording portions including a magnetic recording segment, an intermediate segment and soft magnetic segment etched from a magnetic recording layer, intemediate layer and soft magnetic underlayer.

In particular, in an illustrated embodiment shown in FIG. 4, the recording layer 130 and etched soft magnetic underlayer 134 are etched to form raised recording portions 150 including an etched magnetic recording segment 152, an intermediate non-magnetic segment 154 and a soft magnetic segment 156. The recording portions 150 as shown in FIG. 4 provide an etched soft magnetic segment 156 which increases contribution of the soft magnetic underlayer to the magnetic field generated in the recording layer 130. In particular, the etched soft magnetic underlayer 134 reduces flux leakage in the etched regions 158 of the media. Flux leakage is inversely proportional to the distance of the soft magnetic underlayer 134 from the write pole 122 and thus the etched soft magnetic underlayer regions increase the distance of the soft underlayer in the etched regions 158 from the write pole 122 thereby reducing leakage.

Figure 5:
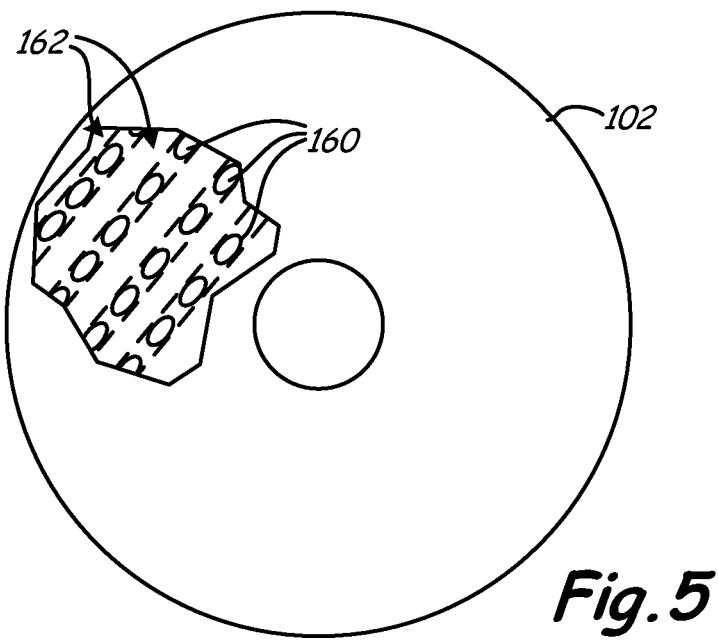
FIG. 5 is a schematic illustration of a data storage media including a plurality of raised recording bits.

FIG. 5 illustrates a recording media where the etched recording portions include a plurality of radially and circumferentially spaced recording bits 160 elevated above recessed or etched portions 162 on the media. As shown in FIG. 5, the raised recording bits 160 are generally oval or elliptically shaped and are sized to store a bit of data recorded on the magnetic media. In the illustrated embodiment of FIG. 6, the plurality of recording bits 160 having an etched magnetic recording segment 164, a non-magnetic segment 166 and soft magnetic segment 168 formed of etched portions of the magnetic recording layer 130, intermediate layer 132 and soft magnetic underlayer 134. In the illustrative embodiment, the raised recording bits 160 cover approximately 25% of the media area and the recessed or etched regions 162 cover approximately 75% of the media area. Thus, in 75% of the media area, flux leakage is reduced via the etched regions of the soft magnetic underlayer 134. Also, there is no loss of magnetic field in the recording portion or bits 160 since the soft magnetic underlayer is etched in the intermediary region between recording portions or bits and the distance of the soft magnetic underlayer or segment from the write pole 122 is the same as in the embodiment illustrated FIG. 3.

Figure 7:
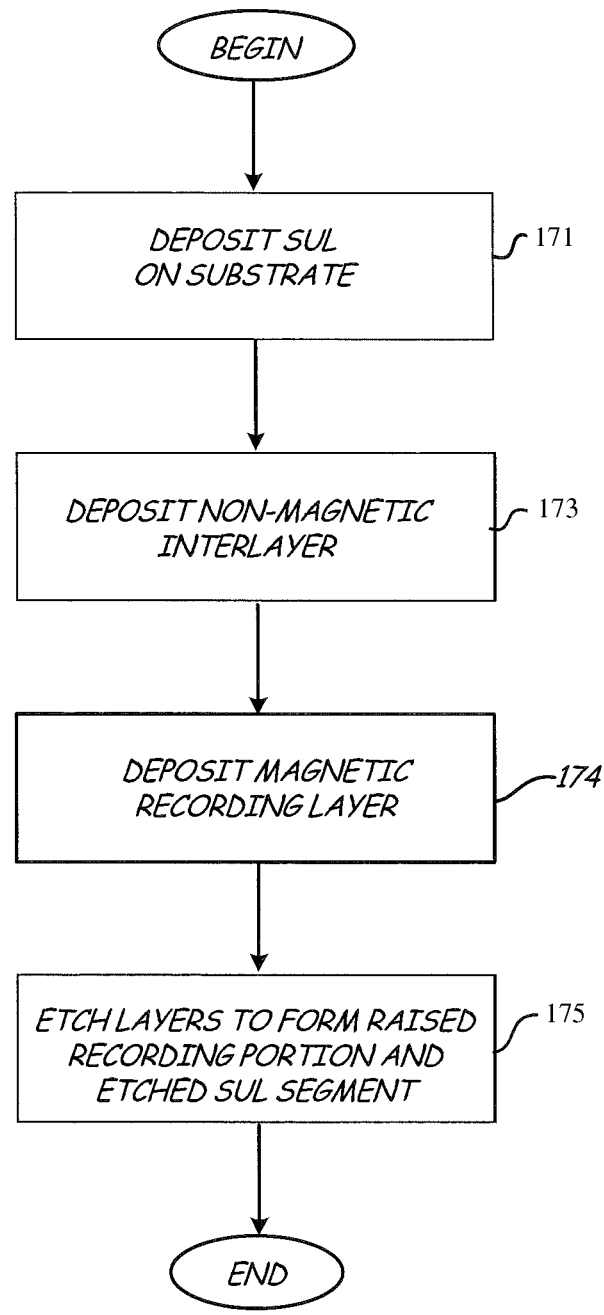
FIG. 7 is a flow chart illustrating fabrication steps for a data storage media.

FIG. 7 illustrates a flow chart illustrating an embodiment for fabricating a recording media including recording portions having a soft magnetic segment as previously described. As 1 shown in FIG. 7, in step 171, a soft magnetic layer is deposited on substrate 136. The soft magnetic layer 134 is deposited using known deposition or sputtering techniques. In step 173, a non-magnetic layer 132 is deposited on the soft magnetic underlayer 134. As shown, in step 174, the magnetic recording layer 130 is deposited on the non-magnetic layer 132. Thereafter in step 175, the magnetic recording layer 130, non-magnetic layer 132 and soft magnetic underlayer 134 are etched to form the raised recording portions having a magnetic recording segment and soft magnetic segment as previously described. Layers are etched using photolithographic techniques or other patterning and etching techniques, such as reactive ion etching (REI), chemical etching or laser etching. Although illustrative steps are shown in FIG. 7, additional or intermediate steps can be utilized to process the magnetic media as described.

The etched depth of soft underlayer 134 can be optimized using finite element modeling (FEM). The FEM is used to balance magnetic properties of magnetic underlayer 134 relative to flux leakage of the soft magnetic underlayer 134. For example, if the etched depth is too depth, the flux path between the write pole 122 and the return pole 124 is degraded. In contrast if the etched depth is not deep enough, flux leakage limits magnetic field strength in the recording layer for a given write pole saturation $B_{sat}$. Based upon FEM, it has been found that an optimum depth is provide based upon a ratio of the pole width $W_{pole}$ relative to etch depth. Optimally, the depth to pole width $W_{pole}$ ratio $D/W_{pole}$ is in the range of 0.5-1.0.

Figure 8:
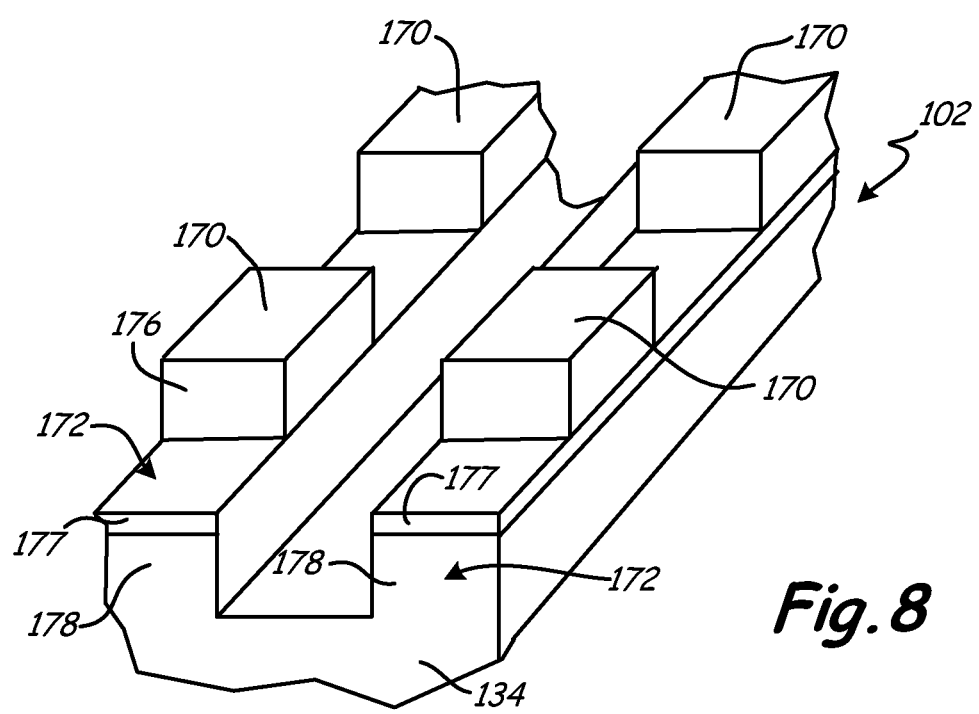
FIG. 8 illustrates an embodiment of a data storage media including radially and circumferentially spaced recording bits having a magnetic recording bit segment and radially spaced recording tracks including soft magnetic track segments.

FIG. 8 illustrates an alternate embodiment of a patterned media structure. As shown, the media structure illustrated in FIG. 8 includes an array of radially and circumferentially spaced recording bits 170 and a plurality of radially spaced recording tracks 172. As shown, the recording bits 170 include etched magnetic bit segments 176 and the radially spaced recording tracks 172 include an etched non-magnetic track segment 177 and soft magnetic track segment 178. The illustrated pattern reduces the tendency of the magnetization of the soft magnetic segment to orient in a vertical direction which can introduce read back noise and write process variability. The recording bits and tracks are formed by etching the magnetic recording layer 130 in a first etching step and etching the non-magnetic layer 132 and soft magnetic layer 134 in a second etching step. As can be seen in FIG. 8, an etched depth of first etched portions that define track segments 177, 178 extends beyond an etched depth of second etched portions that define bit segments 176. Alternatively, in the embodiment illustrated in FIG. 6, the etched depth of the soft magnetic layer or segments 168 is less than width dimensions of the raised recording bits to reduce the propensity of a vertical remnant magnetization in the soft magnetic segments 168.

Figure 6:
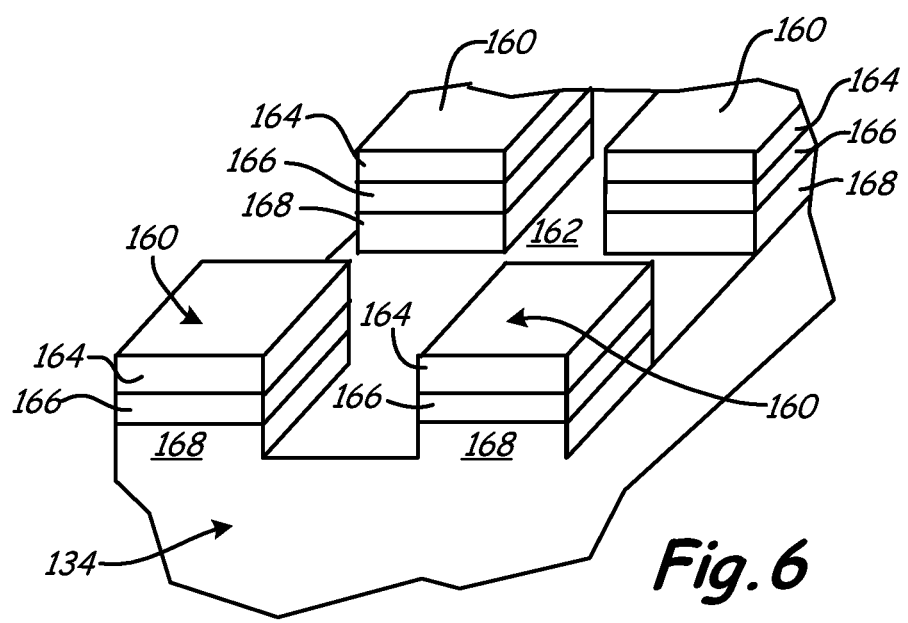
FIG. 6 is a schematic illustration of a magnetic recording media having raised recording bits including a magnetic recording bit segment, an intermediate bit segment and soft magnetic bit segment.
Figure 9:
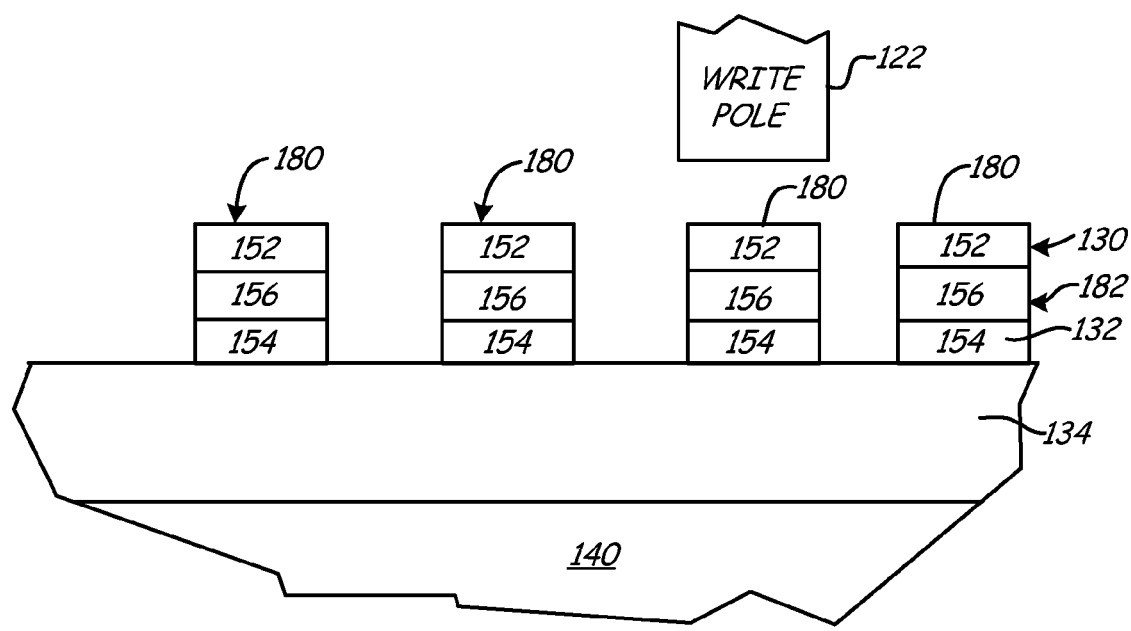
FIG. 9 illustrates an embodiment of a data storage media including etched recording portions including a soft magnetic segment between a magnetic recording segment and non-magnetic segment.

FIG. 9 illustrates another patterned media embodiment. In the embodiment illustrated in FIG. 9, the media includes recording portions 180, which have a soft magnetic segment 156 disposed between the magnetic recording segment 152 and the non-magnetic segment 154. The soft magnetic segment 156 is disposed between the magnetic recording segment 152 and non-magnetic segment 154 to boost the magnetic field in the recording layer or segment 152. The soft magnetic segment 156 is formed between the recording segment 152 and non-magnetic segment 154 by depositing a soft magnetic layer 182 on the non-magnetic layer 132 prior to depositing the magnetic recording layer 130. Thereafter, the magnetic recording layer 130, soft magnetic layer 182 and non-magnetic layer 132 are etched as previously described to form the illustrated recording portions 160 as shown in FIG. 6.

Figure 10:
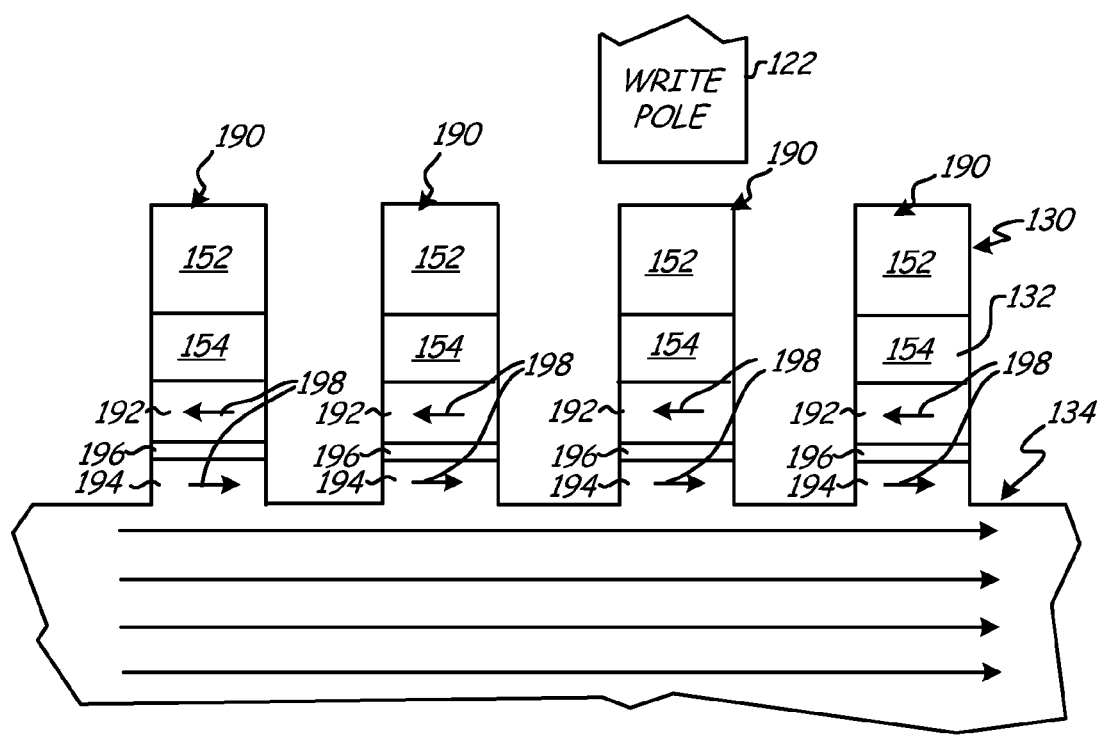
FIG. 10 is a schematic illustration of a data storage media including etched recording portions including a soft magnetic segments and an anti-ferromagnetic segment between the soft magnetic segments.

FIG. 10 illustrates another embodiment wherein the raised recording portions 190 includes multiple soft magnetic segments 192, 194 separated by an anti-ferromagnetic segment 196 to force a horizontal rest magnetization as illustrated by arrows 198. In particular, as shown, the etched or raised recording portions 190 include magnetic recording segment 152, non-magnetic segment 154, a first soft magnetic segment 192, a second soft magnetic segment 194 and an anti-ferromagnetic segment 196 between the first and second soft magnetic segments 192, 194. In the illustrated embodiment the anti-ferromagnetic segment 196 to provide flux closure to remove flux leakage from the soft magnetic underlayer or segment to a read sensor of the head 106. An example of an anti-ferromagnetic layer includes Ruthenium Ru having a thickness in a range of 0.4-1.2 nm, however other thickness dimensions can be used. In one embodiment the thickness of the Ru layer is 0.45 nm.

Figure 11:
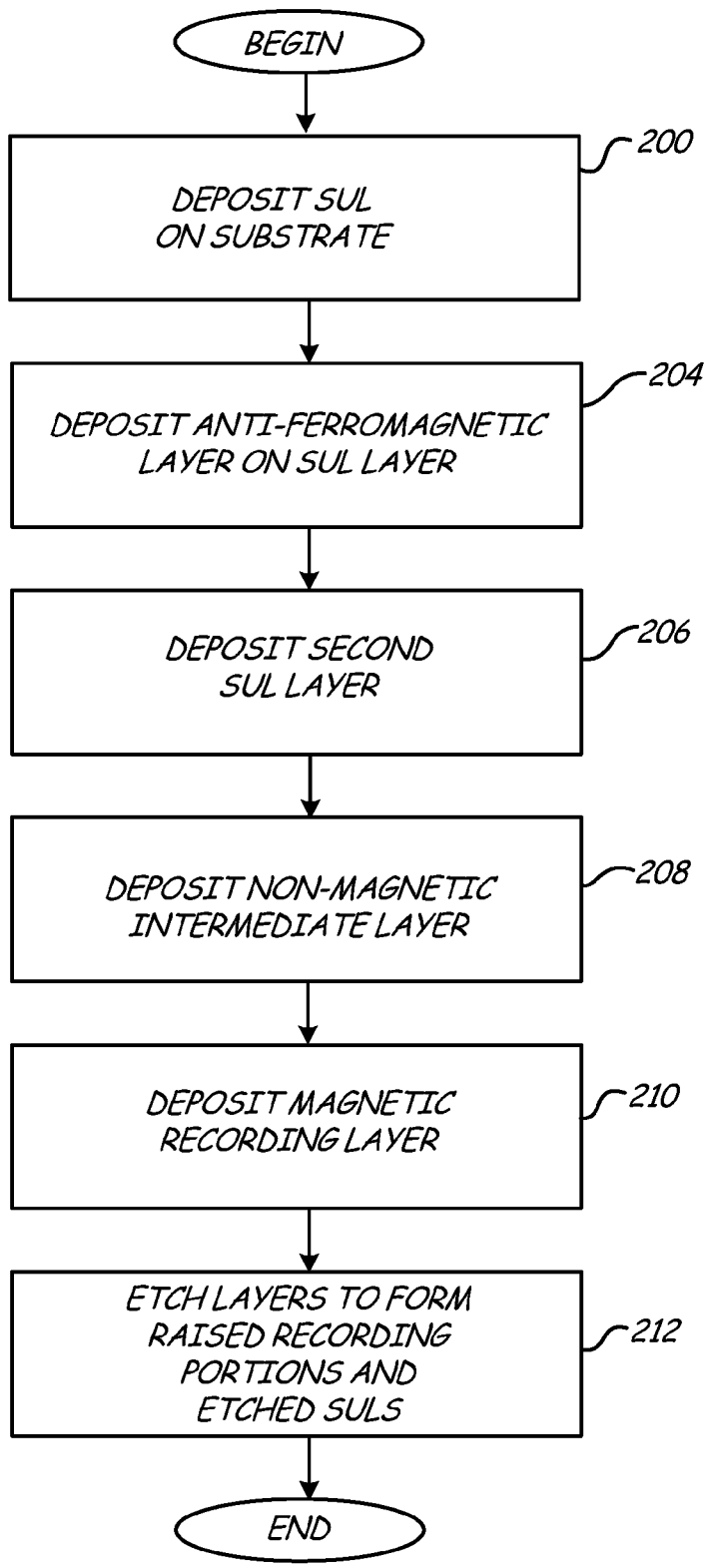
FIG. 11 is a flow chart including processing steps for fabricating a data storage media.

FIG. 11 is a flow chart illustrating fabrication steps for fabricating a soft magnetic segment having anti-ferromagnetic layer as illustrated in the embodiment shown in FIG. 10. In step 200, a soft magnetic layer is deposited on a substrate or media surface. An anti-ferromagnetic layer is deposited on the soft magnetic layer in step 202. In step 204 an anti-ferromagnetic layer is deposited on the soft magnetic layer of step 202. Thereafter a second soft magnetic layer is deposited in the anti-ferromagnetic layer in step 206. A non magnetic intermediate layer is deposited in step 208 and the magnetic recording layer is deposited on the intermediate layer in step 210. The magnetic recording layer, intermediate layer, soft magnetic layers and anti-ferromagnetic layer are etched as illustrated in FIG. 10 to form the raised recording portions as described using known etching and masking processes and techniques.

Figure 12:
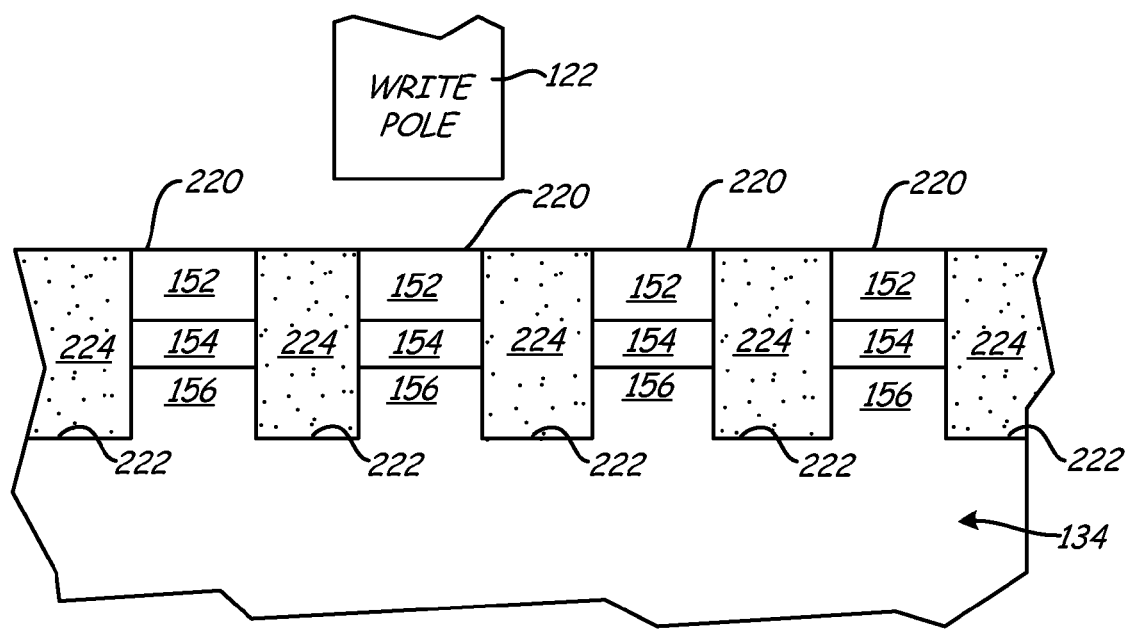
FIGS. 12-14 schematically illustrate embodiments of a data storage media including etched recording portions having a magnetic recording segment and soft magnetic segment and intermediary regions between the recording portions including one or more intermediary layers.
Figure 13:
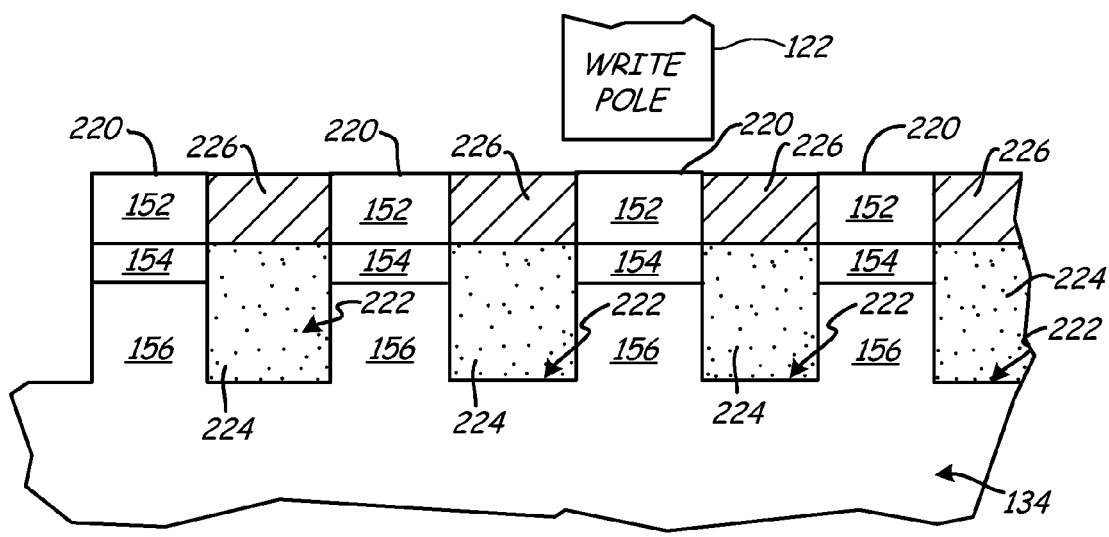
Figure 14:
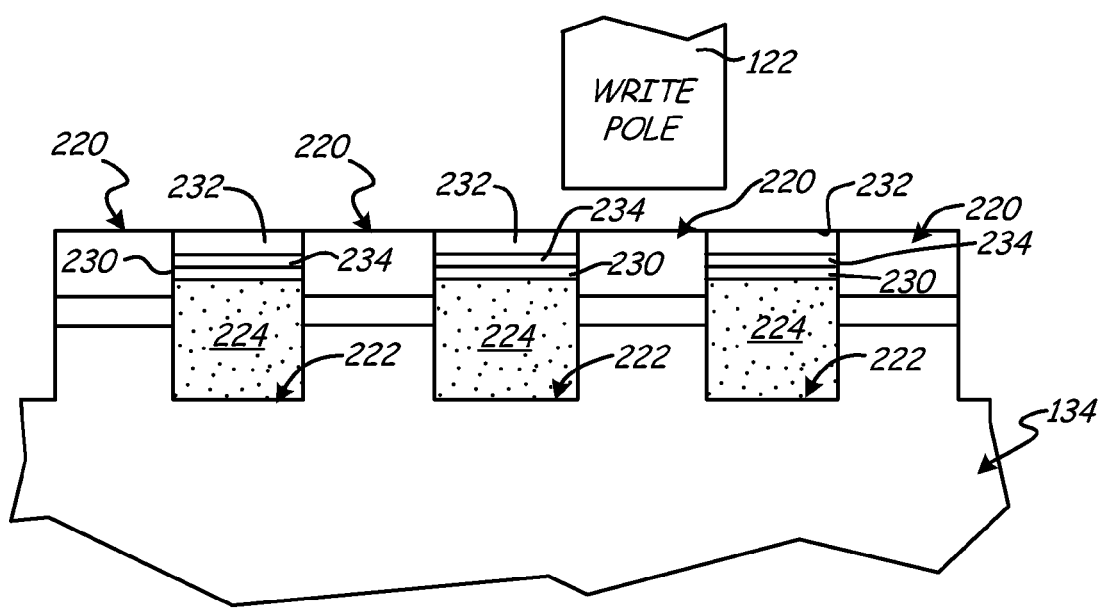

FIGS. 12-14 illustrate embodiments of a patterned media having raised recording portions 220 including etched soft magnetic segments as previously described. The etched recording portions 220 are elevated above etched or intermediary regions 222. In each of the embodiments shown, the etched or intermediary regions 222 include an intermediary layer or portion to enhance magnetic properties of the recording portions 220. In the embodiment illustrated in FIG. 12, the etched or intermediary regions 222 include a non-magnetic layer or portion 224 to limit fringe fields in the intermediary regions 222. The non-magnetic segment or portion 224 controls write fringe fields to minimize the loss of on track write fields and the strength of erase fields on adjacent tracks of the recording portions 220.

In another embodiment illustrated in FIG. 13, the etched or intermediary regions 222 include a non-magnetic layer 224 and a soft magnetic layer 226. As shown, the non-magnetic layer 224 separates the soft magnetic underlayer 134 of the media from the soft magnetic layer 226 in the intermediary regions or portion 222. The soft magnetic layer 226 absorbs fringe fields or flux in the intermediary region or portions 222 to enhance magnetic properties of the recording portions 220. In the embodiment illustrated in FIG. 13, the height of the non-magnetic layer 224 is preferably above the soft magnetic segment 156 to limit flux path or leakage from the write pole 122 through the intermediary regions or portions 222 to the soft magnetic underlayer 134. In alternate embodiments, not shown in FIG. 13, the recording portions 220 or recording bits are formed of etched segments of the magnetic recording layer 130 or etched segments of the magnetic recording layer 130 and non-magnetic layer 132, but not the soft magnetic layer 134. In these embodiments, the intermediary regions or portions 222 formed by the etched segments include a soft magnetic layer 226 or non-magnetic layer 224 and soft magnetic layer 226 to confine magnetic flux to the recording portions 220 or bits as illustrated in FIG. 13.

FIG. 14 illustrates an embodiment where the intermediary regions or portions 222 include a non-magnetic layer 224 proximate to the soft magnetic underlayer 134. As previously described, height of the non-magnetic layer 224 is preferably above the soft magnetic segment 156 to limit flux path or leakage from the write pole 122 through the intermediary regions or portions 222. In the illustrated embodiment, the intermediary regions or portions 222 also include a first soft magnetic layer 230, second soft magnetic layer 232 and an anti-ferromagnetic layer 234 disposed between the first and second soft magnetic layers 230 and 232 to enhance magnetic recording properties of the media. Although a particular recording portion structure is shown in FIGS. 12-14, application is not limited to the particular embodiment shown and the recording portion can have alternative structures as illustrated in FIGS. 9-10.

In other embodiments of FIG. 14, intermediary regions 222 are formed by etched segments or bits of the magnetic recording layer 130 or the magnetic recording layer 130 and non-magnetic layer 132, and not the soft magnetic layer 134. In these embodiments, the intermediary regions 222 include a first soft magnetic layer 230, second soft magnetic layer 232, and anti-ferromagnetic layer 234 in the etched regions of the magnetic recording layer 130; or a first soft magnetic layer 230, second soft magnetic layer 232, anti-ferromagnetic layer 234 and non-magnetic layer 224 in etched regions of the magnetic recording layer 130 and non-magnetic layer 132.

Figure 15:
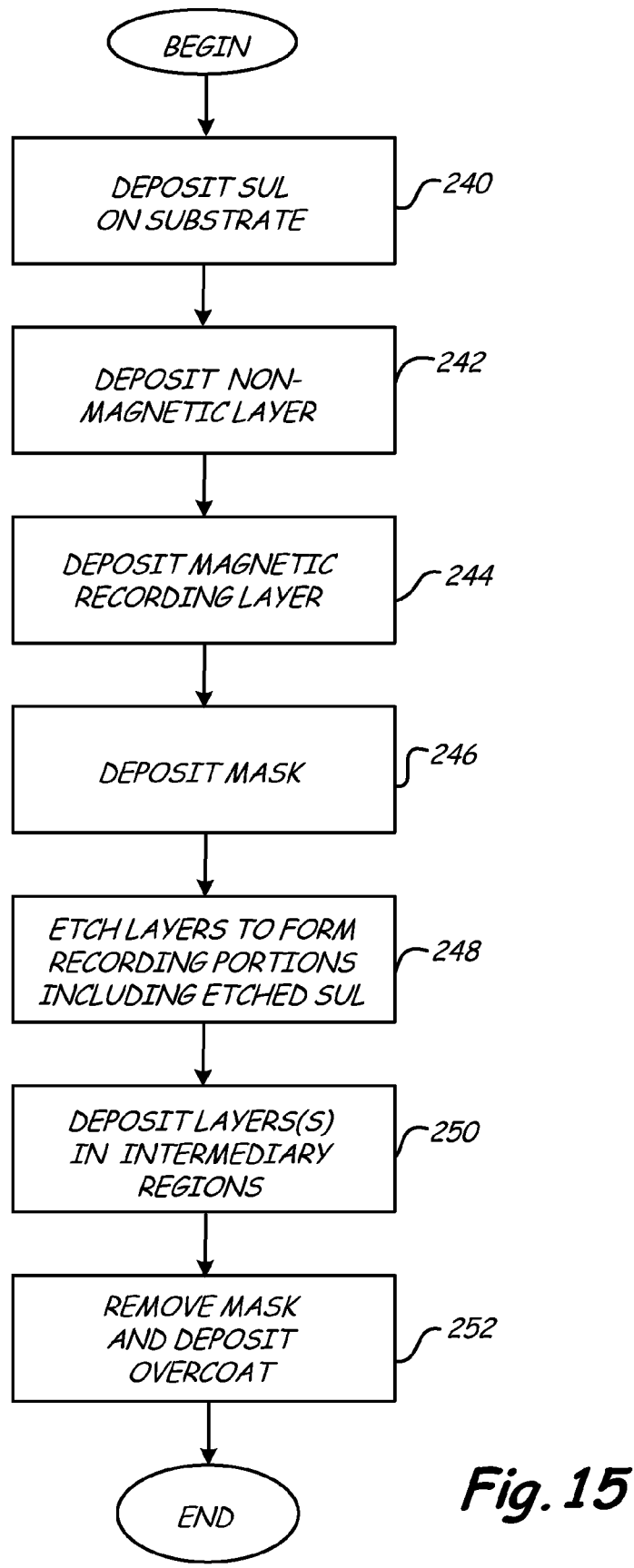
FIG. 15 is a flow chart including processing steps for fabricating a data storage media.

FIG. 15 is a flow chart illustrating steps for fabricating raised recording portions and intermediary regions 222 including one or more layers as previously described. As shown, in step 240, a soft magnetic underlayer 134 is deposited on substrate 136. A non-magnetic layer 132 is deposited on the soft magnetic underlayer 134 in step 242. In step 244, the magnetic recording layer is deposited 244. In step 246 a pattern mask is deposited and the magnetic recording layer 130, non-magnetic layer 132 and soft magnetic underlayer 134 are etched to form raised recording portion including an etched soft magnetic segment and intermediary regions 222. Thereafter in step 250 layers are deposited in the intermediary regions 222 and thereafter, the mask is removed in step 252 and an overcoat layer is deposited on the patterned media.

Although various embodiments are illustrated in the FIGS, application is not limited to the particular embodiments shown and alternate embodiments include selected attributes and features of the various embodiments shown in the FIGS.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiments described herein are directed to a particular recording media, it will be appreciated by those skilled in the art that the teachings of the present invention can be applied to other recording media, without departing from the scope and spirit of the present invention.

What is claimed is:

1. A product comprising:
   a plurality of recording portions including a soft magnetic segment associated with a soft magnetic layer and a -magnetic recording segment associated with a magnetic recording layer above the soft magnetic segment;
   a plurality of etched portions having an etched depth extending through the magnetic recording layer into the soft magnetic layer wherein the plurality of etched portions are interposed between adjacent recording portions; and
   a soft magnetic material in the etched portions interposed between the magnetic recording segments of the adjacent recording portions and occupying a first vertical space in the etched portions along the etched depth, the soft magnetic material being physically separated from the soft magnetic layer by a non-magnetic material.

2. The product of claim 1 wherein the plurality of recording portions include a non-magnetic segment and the etched depth of the plurality of etched portions extends through a non-magnetic layer defining the non-magnetic segment of the plurality of recording portions.

3. The product of claim 2 wherein the soft magnetic segment is between the magnetic recording segment and the non-magnetic segment.

4. The product of claim 2 wherein the non-magnetic segment of the plurality of recording portions is between the magnetic recording segment and the soft magnetic recording segment.

5. The product of claim 4 wherein the soft magnetic segment has a higher permeability than the magnetic recording segment.

6. The product of claim 1 wherein the plurality of recording portions include a plurality of spaced recording bits including a soft magnetic bit segment and a magnetic recording bit segment.

7. The product of claim 1 wherein the plurality of recording portions includes a plurality of recording bits including magnetic recording bit segments and a plurality of recording tracks including soft magnetic track segments and the plurality of etched portions include etched track segments having an etched depth into the soft magnetic layer and etched bit segments having an etched depth through the magnetic recording layer.

8. The product of claim 1 wherein the plurality of recording portions include a first soft magnetic segment and a second soft magnetic segment and an anti-ferromagnetic segment between the first and second soft magnetic segments and the etched depth of the etched portions extends through a first soft magnetic layer defining the first soft magnetic segment, an anti-ferromagnetic layer defining the anti-ferromagnetic segment into a second soft magnetic layer defining the second soft magnetic segment.

9. The product of claim 1 wherein the non-magnetic material in the etched portions is interposed between the adjacent recording portions and occupies a second vertical space in the etched portions along the etched depth.

10. The product of claim 9 and comprising a first magnetic segment, a second magnetic segment and an anti-ferromagnetic segment in between the first and second magnetic segments in the etched portions interposed between the magnetic recording segments of the adjacent recording portions and occupying a third vertical space in the etched portions along the etched depth, wherein at least one of the first magnetic segment or the second magnetic segment comprises the soft magnetic material interposed between the magnetic recording segments of the adjacent recording portions and occupying the first vertical space in the etched portions.

11. The product of claim 9 wherein the non-magnetic material in the etched portions is adjacent to the soft magnetic segment of the recording portions and has a dimension configured to separate the soft magnetic material in the etched portions from the soft magnetic segment of the recording portions.

12. A product comprising;
   a substrate;
   a soft magnetic layer deposited over the substrate; and
   a patterned magnetic recording layer and non-magnetic layer deposited over the soft magnetic layer, the patterned recording layer and non-magnetic layer including etched portions having an etched depth extending through the magnetic recording layer into the non-magnetic layer to define a pattern of magnetic recording segments and non-magnetic segments,
   wherein the etched portions of the patterned magnetic recording layer and non-magnetic layer include a soft magnetic material that occupies a vertical space in the etched portions, and
   wherein the soft magnetic material that occupies the vertical space in the etched portions is physically separated from the soft magnetic layer deposited over the substrate by a non-magnetic material.

13. A product comprising:
   an etched pattern including first etched portions, which define a plurality of radially spaced circumferential recording tracks, and second etched portions, which define an array of circumferentially spaced recording bits on each of the plurality of radially spaced circumferential recording tracks, the recording bits comprising a hard magnetic material, wherein a first etched depth of the first etched portions extends beyond a second etched depth of the second etched portions, and wherein each of the plurality of radially spaced circumferential recording tracks defined by respective ones of the first etched portions extends continuously between adjacent recording bits in that circumferential recording track.

14. The product of claim 13 wherein the recording bits include magnetic bit segments.

15. The product of claim 13 wherein the circumferential recording tracks comprise non-magnetic track segments that extend continuously between the adjacent recording bits in the same circumferential track.

16. The product of claim 13 wherein the recording tracks further comprise soft magnetic track segments that extend continuously between the adjacent recording bits in the same circumferential track.

* * * * *